US012595202B2

(12) United States Patent　　　(10) Patent No.: US 12,595,202 B2

Azuma　　　(45) Date of Patent: Apr. 7, 2026

(54) METHOD FOR MANUFACTURING GLASS PLATE INCLUDING PROCESSING FOR CHAMFERING EDGE SURFACE

(71) Applicant: HOYA CORPORATION, Tokyo (JP)

(72) Inventor: Shuhei Azuma, Hung Yen Province (VN)

(73) Assignee: HOYA CORPORATION, Tokyo (JP)

( * ) Notice: Subject to any disclaimer, the term of this patent is extended or adjusted under 35 U.S.C. 154(b) by 282 days.

(21) Appl. No.: 18/254,369

(22) PCT Filed: Nov. 25, 2021

(86) PCT No.: PCT/JP2021/043198

§ 371 (c)(1),
(2) Date: May 24, 2023

(87) PCT Pub. No.: WO2022/114060

PCT Pub. Date: Jun. 2, 2022

(65) Prior Publication Data

US 2024/0018031 A1　　　Jan. 18, 2024

(30) Foreign Application Priority Data

Nov. 25, 2020　(VN) .............................. 1-2020-06805

(51) Int. Cl.
　*B23K 26/354*　　　(2014.01)
　*B23K 26/00*　　　(2014.01)
　(Continued)

(52) U.S. Cl.
　CPC ........ *C03B 33/082* (2013.01); *B23K 26/0006* (2013.01); *B23K 26/354* (2015.10); (Continued)

(58) Field of Classification Search
　CPC ... C03B 33/082; C03B 21/06; C03B 33/0222; C03B 33/091; C03B 29/02;
　(Continued)

(56) References Cited

U.S. PATENT DOCUMENTS

2003/0096078 A1　5/2003　Horisaka et al.
2005/0223744 A1　10/2005　Horisaka et al.
(Continued)

FOREIGN PATENT DOCUMENTS

JP　H02-241684 A　9/1990
JP　2003-160348 A　6/2003
(Continued)

OTHER PUBLICATIONS

Translation of the International Search Report mailed on Jan. 25, 2022.

*Primary Examiner* — William P Fletcher, III
(74) *Attorney, Agent, or Firm* — Spencer Fane LLP

(57) ABSTRACT

In a method for manufacturing a glass plate that includes chamfering processing for chamfering an edge surface of a glass plate, the chamfering processing includes a step of forming a chamfered surface by irradiating the edge surface of the glass plate with a laser beam, and a step of heating the glass plate before the chamfered surface is formed. When a temperature of the glass blank at which the glass blank is heated is Tp [° C.], a glass transition point of the glass blank is Tg [° C.], and an average coefficient of linear thermal expansion of the glass blank is $\alpha$ [1/° C.], $(Tg-Tp) \leq -5.67 \times 10^7 \cdot \alpha + 840$ is satisfied.

16 Claims, 2 Drawing Sheets

(51) Int. Cl.

| | | |
|---|---|---|
| *B24B 7/24* | (2006.01) | |
| *C03B 33/08* | (2006.01) | |
| *C03C 17/00* | (2006.01) | |
| *G11B 5/84* | (2006.01) | |

(52) U.S. Cl.
   CPC ............ *B24B 7/241* (2013.01); *C03C 17/002* (2013.01); *G11B 5/84* (2013.01); *C03C 2218/31* (2013.01)

(58) Field of Classification Search
   CPC .. B23K 26/0006; B23K 26/354; B24B 7/241; C03C 17/002; C03C 2218/31; C03C 23/0025; C03C 19/00; G11B 5/84; G11B 5/8404
   See application file for complete search history.

(56) References Cited

U.S. PATENT DOCUMENTS

| | | | |
|---|---|---|---|
| 2008/0202167 A1 | 8/2008 | Cavallaro et al. | |
| 2010/0320179 A1 | 12/2010 | Morita et al. | |
| 2022/0089479 A1 * | 3/2022 | Azuma | ............... C03C 23/0025 |
| 2022/0227654 A1 * | 7/2022 | Azuma | ............. B23K 26/0006 |
| 2022/0274870 A1 | 9/2022 | Azuma | |
| 2022/0298053 A1 | 9/2022 | Takizawa et al. | |

FOREIGN PATENT DOCUMENTS

| | | | |
|---|---|---|---|
| JP | 2004-035333 A | 2/2004 | |
| JP | 2010-519164 A | 6/2010 | |
| JP | 2013016214 A | 1/2013 | |
| JP | 2013206517 A | 10/2013 | |
| WO | 2009050938 A1 | 4/2009 | |
| WO | WO-2020111282 A1 * | 6/2020 | ............. B24B 37/08 |
| WO | 2021020587 A1 | 2/2021 | |
| WO | 2021033758 A1 | 2/2021 | |

* cited by examiner

METHOD FOR MANUFACTURING GLASS PLATE INCLUDING PROCESSING FOR CHAMFERING EDGE SURFACE

CROSS-REFERENCE TO RELATED APPLICATIONS

This U.S. National stage application of International Patent Application No. PCT/JP2021/043198, filed on Nov. 25, 2021, which, in turn, claims priority to Vietnamese Patent Application No. 1-2020-06805, filed in Vietnam on Nov. 25, 2020. The entire contents of Vietnamese Patent Application No. 1-2020-06805 are hereby incorporated herein by reference.

BACKGROUND

Field of the Invention

The present invention relates to a method for manufacturing a glass plate including processing for chamfering an edge surface of a glass blank, a method for manufacturing a glass substrate for a magnetic disk, a method for manufacturing a magnetic disk, and an annular glass plate.

Background Information

A magnetic disk obtained by providing a magnetic film on an annular glass substrate for a magnetic disk is used in an HDD (hard disk drive) device for recording data.

When a magnetic-disk glass substrate is manufactured, particles are likely to form on edge surfaces of an annular glass plate that is the base of the magnetic-disk glass substrate that will be a final product, and therefore it is preferable that edge surfaces of the annular glass plate are smoothened in order to inhibit fine particles from adhering to main surfaces thereof, and from adversely affecting the performance of the magnetic disk. Also, it is preferable that edge surfaces of the glass plate have target shapes to precisely incorporate a magnetic disk into an HDD, and make an outer circumferential edge surface of the glass substrate suitable to be held by a jig for holding the outer circumferential edge surface when a magnetic film is formed on the main surfaces of the glass substrate.

A method exists for finishing an edge of a sheet such as a glass plate, which is known as a method for making an edge surface of a glass plate into a target shape (JP 2010-519164). In this finishing method, the edge of the sheet is preheated to high temperatures, the preheated edge is further heated with a laser beam, and after the edge is heated with the laser beam, the edge is annealed to reduce residual stress. This suppresses an unacceptable amount of residual tensile stress along the edge, and the occurrence of fractures or defects.

SUMMARY

However, if the above-described method for finishing an edge is applied to an annular glass blank, which is the base of a glass substrate for a magnetic disk (magnetic-disk glass substrate), there are cases in which glass plates crack after heating through irradiation with a laser beam and before annealing, for example, immediately after laser photoirradiation.

Also, annealing after heating through photoirradiation is also disadvantageous in terms of production efficiency.

In view of this, the present invention aims to provide a method for manufacturing a glass plate in which a glass plate does not crack after irradiation with a laser beam when an edge surface is chamfered through irradiation with a laser beam, a method for manufacturing a magnetic-disk glass substrate, and a method for manufacturing a magnetic disk, and an annular glass plate that is unlikely to crack.

One aspect of the present invention is a method for manufacturing a glass plate, the method including processing for chamfering an edge surface, in which the chamfering processing includes:

a step of forming a chamfered surface by irradiating, with a laser beam, the edge surface of a glass blank before being subjected to the chamfering processing; and a step of heating the glass blank before irradiation with the laser beam, in which, when a temperature of the glass blank at which the glass blank is heated is Tp [° C.], a glass transition point of the glass blank is Tg [° C.], and an average coefficient of linear thermal expansion of the glass blank is $\alpha$ [1/° C.], $(Tg-Tp) \le -5.67 \times 10^7 \cdot \alpha + 840$ is satisfied.

It is preferable that $(Tg-Tp) \le -3.67 \times 10^7 \cdot \alpha + 500$ is satisfied.

It is preferable that $(Tg-Tp) \le -3.28 \times 10^7 \cdot \alpha + 428$ is satisfied.

It is preferable that $(Tg-Tp) \ge 50°$ C. is satisfied. Note that it is further preferable that $(Tg-Tp) \ge 100°$ C. is satisfied.

It is preferable that the glass blank has an average coefficient of linear thermal expansion $\alpha$ of $20 \times 10^{-7}$ [1/° C.] to $60 \times 10^{-7}$ [1/° C.].

It is preferable that annealing processing is not performed on the glass blank obtained after being subjected to the chamfering processing.

Another aspect of the present invention is a method for manufacturing a magnetic-disk glass substrate, using the method for manufacturing a glass plate.

The glass blank has an annular shape.

After the glass plate is manufactured using the method for manufacturing a glass plate, a magnetic-disk glass substrate is manufactured by grinding and/or polishing a main surface of the glass plate.

Yet another aspect of the present invention is a method for manufacturing a magnetic disk, in which a magnetic film is formed on the main surface of the magnetic-disk glass substrate manufactured using the method for manufacturing a magnetic-disk glass substrate.

Still another aspect of the present invention is an annular glass plate having a circular hole at a central portion of the glass plate, the annular glass plate including:

a main surface, an inner circumferential edge surface forming a contour of the circular hole, and an outer circumferential edge surface;

wherein the glass plate has chamfered surfaces on the inner circumferential edge surface and the outer circumferential edge surface, and the maximum residual stress at an end portion of the main surface in a vicinity of the inner circumferential edge surface is larger than the maximum residual stress at an end portion of the main surface in a vicinity of the outer circumferential edge surface.

It is preferable that any portion of the main surface of the glass plate has a residual stress of 50 [nm] or less in terms of a retardation value.

It is preferable that the glass plate is a magnetic-disk glass substrate, and the main surface has an arithmetic average roughness Ra of 0.2 nm or less.

According to the above-described method for manufacturing a glass plate, method for manufacturing a magnetic-disk glass substrate, and method for manufacturing a magnetic disk, when an edge surface of a glass blank is chamfered through irradiation with a laser beam, a glass plate does not crack after irradiation with the laser beam.

DETAILED DESCRIPTION OF THE EMBODIMENTS

The following describes a method for manufacturing a glass plate, a method for manufacturing a magnetic-disk glass substrate, a method for manufacturing a magnetic disk, and an annular glass plate according to one embodiment in detail.

A method for manufacturing a glass plate according to one embodiment includes chamfering processing for chamfering an edge surface of a glass blank. Although a chamfered surface is formed by irradiating the edge surface of the glass blank with a laser beam in the chamfering processing, the glass blank is heated before the chamfering processing is performed. Hereinafter, this heating is referred to as preheating. That is to say, as a result of preheating the glass blank, the edge surface can be easily melted or softened through irradiation with a laser beam, and thus the chamfered surface can be formed. Also, as a result of preheating the glass blank, it is possible to reduce or inhibit cracking in the glass plate immediately after the chamfered surface is formed through irradiation with a laser beam. However, even if the glass plate does not crack immediately after the chamfered surface is formed, as described above, when a predetermined time has passed, delayed cracking sometimes occurs in the glass plates immediately before a post-process is performed after the chamfering processing. Hereinafter, a crack that occurs with such a delay is referred to as a "delayed crack".

In view of this, the inventor of the invention of this application discovered the following measures as a result of conducting intensive studies on measures for suppressing delayed cracks, as well as cracks, which occur in a glass plate immediately after irradiation with a laser beam for forming a chamfered surface due to residual strain that occurs in the chamfered glass plate. That is to say, when the temperature of a glass blank at which the glass blank is heated is Tp [° C.], the glass transition point of the glass blank is Tg [° C.], and the average coefficient of linear thermal expansion of the glass blank is α [1/° C.], the temperature Tp is set to satisfy $(Tg–Tp) \leq -5.67 \times 10^7 \cdot \alpha + 840$ in order to prevent cracks from occurring in the glass plate immediately after irradiation with a laser beam. Here, the average coefficient of linear thermal expansion α is a coefficient of linear thermal expansion at 100° C. to 300° C. Note that the glass transition point Tg and the average coefficient of linear thermal expansion α can be measured using a thermomechanical analyzer (TMA; Thermomechanical Analysis), for example.

The above-described measures make it possible to prevent cracks from occurring in a glass plate immediately after irradiation with a laser beam, and limiting the above-described range of (Tg–Tp) makes it possible to prevent a delayed crack from occurring in the glass plate before a post-process is performed after chamfering processing, and to prevent a fracture from occurring in the glass plate.

Figure 1A:
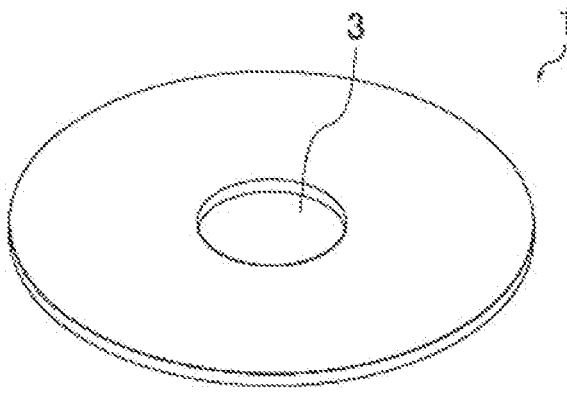
FIG. 1A is a perspective view of one example of a glass plate manufactured using a method for manufacturing a glass plate according to one embodiment.
Figure 1B:
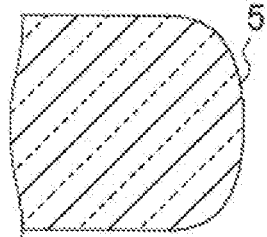
FIG. 1B is a diagram showing one example of a cross-sectional shape of a chamfered surface.
Figure 1C:
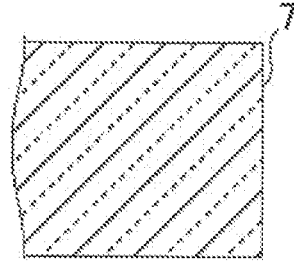
FIG. 1C is a diagram showing one example of the shape of an edge surface of a glass blank before being subjected to chamfering processing.

FIG. 1A is a perspective view of one example of a glass plate manufactured using a method for manufacturing a glass plate according to one embodiment, FIG. 1B is a diagram showing one example of a cross-sectional shape of a chamfered surface, and FIG. 1C is a diagram showing one example of the shape of an edge surface of a glass plate before being subjected to chamfering processing.

A glass plate 1 shown in FIG. 1A is an annular and thin glass plate having a circular hole 3 at a central portion thereof.

The glass plate need not have an annular shape, and the outer circumference of the glass plate may have a circular plate shape provided with no circular hole 3. Also, the glass plate need not have a circular plate shape with a circular outer circumference, and may be a rectangular glass plate, and the shape of the glass plate is not particularly limited.

If the glass plate 1 has an annular shape, the glass plate 1 can be used as the base of a magnetic-disk glass substrate. If such a magnetic-disk glass substrate is produced, there is no limitation on the size of a magnetic-disk glass substrate. In the case of a magnetic-disk glass substrate with a nominal diameter of 3.5 inches, the outer diameter (nominal value) thereof is in a range of 95 mm to 100 mm, and the inner diameter (nominal value) thereof is 25 mm, for example. In the case of a magnetic-disk glass substrate with a nominal diameter of 2.5 inches, the outer diameter (nominal value) thereof is in a range of 65 mm to 70 mm, and the inner diameter (nominal value) thereof is 20 mm, for example. The thickness of a magnetic-disk glass substrate is in a range of 0.20 mm to 0.7 mm, for example, and preferably 0.30 mm to 0.6 mm, and more preferably 0.30 mm to 0.53 mm. A magnetic disk can be produced by forming a magnetic film on a main surface of this magnetic-disk glass substrate.

A chamfered surface is formed on an edge surface of the glass plate 1 shown in FIG. 1A by chamfering the edge surface. FIG. 1B is a diagram showing one example of a cross-sectional shape of the chamfered surface formed in the present invention. The cross-sectional shape refers to the shape of an edge surface obtained by cutting the glass plate 1 along a plane passing through the central axis (rotation axis when the glass plate is to be a glass substrate for a magnetic disk) of the glass plate along the radial direction. As shown in FIG. 1B, the cross-sectional shape of an edge surface 5 that includes a chamfered surface is a curved surface shape formed by a smooth curve protruding outward in the radial direction. The edge surface 5 that includes the chamfered surface will also be simply referred to as "edge surface 5" hereinafter.

Although the edge surface 5 is a curved surface formed by a smooth curve protruding outward in the radial direction in the example shown in FIG. 1B, as another example, the edge surface 5 may have two curved surfaces that are respectively continuous with the two main surfaces, and a side wall surface that is located between the two curved surfaces and is located at the center portion of the edge surface and that extend linearly in the thickness direction of the glass plate 1. As yet another example, the edge surface 5 may have two inclined surfaces that are respectively continuous with the two main surfaces, and a side wall surface that is located between the two inclined surfaces and is located at the center portion of the edge surface such that all of the two inclined surfaces and the side wall surface extend substantially linearly in the thickness direction. Note that the border portions of the above-described surfaces may be rounded or angular. A chamfered length of the chamfered glass plate 1 can be defined as the difference between the radius of the glass plate 1 at a position where the edge surface protrudes most in the radial direction and the radius thereof at a position where the main surface starts to incline toward the edge surface, and the chamfered length may be 30 to 200 μm, for example.

In the case of a magnetic-disk glass substrate, a magnetic disk is produced by grinding and polishing main surfaces of the glass plate 1 as needed, and then forming a magnetic film on the main surfaces of the glass plate 1.

FIG. 1C is a diagram showing one example of the shape of an edge surface 7 of a glass blank before being subjected to chamfering processing. By irradiating the edge surface 7 with a laser beam, which will be described later, a corner portion of a border portion between the main surface and the edge surface 7 of the glass blank is melted, resulting in a curved surface as shown in FIG. 1B, for example. An edge surface 7 of the glass blank before being subjected to chamfering processing is a surface that is substantially orthogonal to the main surfaces of the glass blank. Such a surface is preferable because the edge surface 5 that includes a chamfered surface can be formed symmetrically with respect to the main surfaces located on both sides by irradiating the edge surface 7 with a laser beam, which will be described later. Note that the shape of the edge surface 7 shown in FIG. 1C is an example, is not limited to a shape that is substantially orthogonal to the main surfaces, and may be a shape with round corner portions, or a shape in which the corner portions thereof are inclined with respect to the main surfaces.

Before irradiation with a laser beam performed for chamfering processing, the glass blank shown in FIG. 1C is preheated. In preheating, the glass blank is placed in the space where a heater or the like is placed, and the temperature of the entire glass blank is increased to the temperature Tp. An infrared heater such as a halogen lamp heater, a carbon heater, or a sheathed heater can be used as a heater, for example. The temperature of the glass blank is unlikely to change depending on a portion of the glass blank, and is kept substantially uniform. A substantially uniform temperature means that a temperature difference between the maximum temperature and the minimum temperature is 50° C. or less, for example. As a result of keeping the temperature of the glass blank at a substantially uniform temperature Tp, it is also possible to make the temperature obtained when irradiating the edge surface 7 of the glass blank with a laser beam uniform on the entire circumference of the edge surface 7, and as a result it is possible to stably form the shape of a chamfered surface, which is affected by the molten state of glass of the edge surface 7 of the glass blank, to a certain shape in a circumferential direction.

Further, when preheating is performed such that the temperature of the glass blank becomes substantially uniform on the main surface thereof, it is possible to reduce the temperature difference in a radial direction from the vicinity of the edge surface of the annular glass blank toward the center during irradiation with a laser beam, and thus to reduce the maximum value (peak) of residual strain occurring in the vicinity of the edge surface, which will be described later. Preheating is preferable because trouble (cracks, delayed cracks, fractures, and the like), which may arise after chamfering processing using a laser beam, can be easily suppressed.

On the other hand, if only the edge surface 7 of the glass blank and end portions of the main surfaces located in the vicinity of the edge surface 7 are locally heated to the temperature Tp, glass is unlikely to conduct heat toward the center of the glass blank because glass is a material having relatively low thermal conductivity, which results in a large temperature difference between the end portions of the main surfaces of the glass blank and portions located inward in the radial direction with respect to these end portions of the main surfaces. Irradiation with a laser beam in this state is not preferable because the temperature difference is further increased due to heating being applied by the laser beam, and a high residual strain (residual stress) is likely to occur locally.

The temperature Tp is the temperature of the glass blank 10 at the start of irradiation with a laser beam L. Further, the glass blank with the temperature Tp can be irradiated with a laser beam while being irradiated with infrared rays or the like by a heater so as to maintain the temperature Tp.

Figure 2:
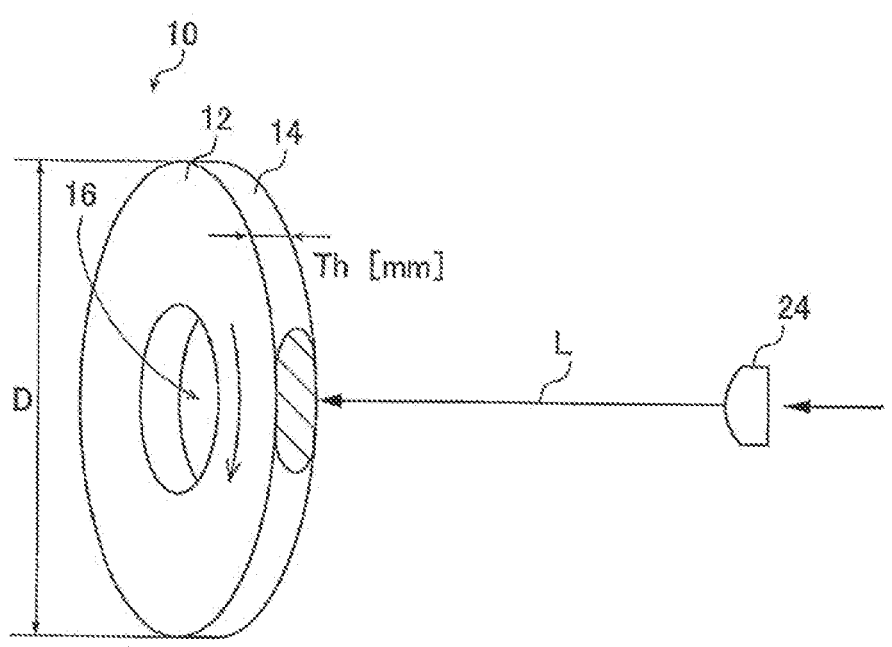
FIG. 2 is a diagram showing one example of formation of a chamfered surface through irradiation with a laser beam performed in one embodiment.

FIG. 2 is a diagram showing one example of formation of a chamfered surface through irradiation with a laser beam. Specifically, as shown in FIG. 2, the circular plate-shaped glass blank 10 provided with a circular hole 16 has main surfaces 12 and an edge surface 14. The main surfaces 12 usually have substantially the same shape on the front and back sides (also referred to as two main surfaces hereinafter). The edge surface 14 is an edge surface that is substantially perpendicular to the main surfaces 12. Although an outer circumferential edge surface is denoted as the edge surface 14 to be subjected to shape processing by the laser beam L in the example shown in FIG. 2, an inner circumferential edge surface extending along the circular hole 16 can also be subjected to shape processing by the laser beam L.

In this embodiment, the edge surface 14 is irradiated with the laser beam L, and the edge surface 14 is processed into a target shape as the laser beam L is moved relative to the edge surface 14 in the circumferential direction of the circular plate-shaped glass blank 10. A method for irradiation with the laser beam L includes, for example, a method in which the laser beam L emitted from a laser source (not shown) is converted into parallel light through an optical system that includes a collimator and the like, the laser beam L is focused through a focusing lens 24, and the edge surface 14 is irradiated with the expanding laser beam L.

Note that, if the inner circumferential edge surface is to be irradiated with the laser beam L, the laser beam L entering from above a main surface of the glass blank 10 need only be reflected by a reflective mirror installed in the circular hole, for example.

Note that, if the outer circumferential edge surface and the inner circumferential edge surface are to be subjected to chamfering processing, the outer circumferential edge surface and the inner circumferential edge surface may be subjected to chamfering processing simultaneously or separately. If the outer and inner circumferential edge surfaces are to be subjected to chamfering processing, it does not matter which edge surface is to be subjected to chamfering processing first. Although preheating may be performed for each instance of chamfering processing or at the first time, the latter can improve production efficiency.

On the other hand, the glass blank 10 is rotated at a constant speed with the central position of the glass blank 10 as the center of rotation. In this manner, the entire circumference of the edge surface 14 of the glass blank 10 is irradiated with the laser beam L while the laser beam L and the edge surface 14 are moved relative to each other in the circumferential direction of the disk-shaped glass blank 10.

Here, it is preferable that the edge surface 14 is irradiated with the laser beam L from a normal direction at the position at which the edge surface 14 is irradiated. The normal direction here includes not only a perfectly normal direction (at an inclination angle of 0 degrees to the normal direction) but also the range where the inclination angle to the normal direction is within 10 degrees as an allowable range. Note that the edge surface 14 may be irradiated with the laser beam L within a range of an inclination angle of 0 degrees±45 degrees with respect to the normal direction of the edge surface 14 at the irradiation position.

Such an annular glass blank 10 can be obtained from plate-shaped glass produced in advance, using a separation method in which a laser beam or the like is used, for example. Plate-shaped glass, which is the base of the annular glass blank 10, is produced using a floating method or a downdraw method, for example. Alternatively, the plate-shaped glass may be obtained by press-molding a lump of molten glass using a mold. The thickness of plate-shaped glass, which is the base of the glass blank 10, is larger than a target thickness of a magnetic-disk glass substrate, which will be the final product, by an amount of machining allowance from grinding and polishing, and the plate-shaped glass is thicker by an amount of about 10 to 300 $\mu$m, for example.

The cross-sectional intensity distribution of the laser beam L with which the edge surface 14 is irradiated can be set to a single mode. That is to say, the cross-sectional intensity distribution of the laser beam L can be set to a Gaussian distribution. It is preferable to use irradiation conditions in which W1>Th holds true, and Pd×Th is in a range of 0.8 to 15 [W/mm] in irradiation with the laser beam L when the width of the luminous flux (irradiation spot) of the laser beam L in the thickness direction of the glass blank 10 on an irradiation position of the edge surface 14 is W1 [mm], the thickness of the glass blank 10 is Th [mm], and the average power density of the laser beam L is Pd [W/mm$^2$]. Here, as shown in FIG. 2, it is preferable that the luminous flux of the laser beam L is emitted so as to protrude on both sides in the thickness direction of the glass blank 10. Also, chamfering can be evenly performed on both sides in the thickness direction of the glass blank 10 by making the widths of the protrusions on both sides of the edge surface 14 equal to each other, and the shapes of two chamfered surfaces can be made equal to each other. The average power density Pd is a value obtained by dividing the total power P [W] of the laser beam L by the area of the luminous flux in a portion irradiated with the laser beam L. If the luminous flux of the laser beam L forms an elliptical shape (see FIG. 2) having a short axis radius of W1/2 and a long axis radius of W2/2, the average power density Pd is defined as 4×P/W1/W2/$\pi$ [W/mm$^2$] ($\pi$ indicates pi). The average power density Pd can be 1 to 30 [W/mm$^2$], for example.

Here, although a $CO_2$ laser beam is used as one example of the laser beam L, the laser beam L is not limited to the $CO_2$ laser beam as long as it has an oscillation wavelength that is absorbed by glass. Examples of the laser beam L include CO lasers (having an oscillation wavelength of about 5 $\mu$m and 10.6 $\mu$m) and Er-YAG lasers (having an oscillation wavelength of about 2.94 $\mu$m). If a $CO_2$ laser beam is used, it is preferable that the wavelength thereof is set to 3 $\mu$m or more. Also, it is more preferable that the wavelength thereof is set to 11 $\mu$m or less. If the wavelength of a laser beam is shorter than 3 $\mu$m, there are cases where glass is unlikely to absorb the laser beam, and the edge surface 14 of the glass blank 10 cannot be sufficiently heated. Also, if the wavelength thereof is longer than 11 $\mu$m, there are cases where it is difficult to obtain a laser device. Note that the oscillation form of a laser beam source is not particularly limited, and any one of continuous oscillation light (CW light), pulse oscillation light, and light obtained by modulating continuous oscillation light may be used. However, in the case of pulse oscillation light and modulated light of continuous oscillation light, there is a concern that, if the relative moving speed of the laser beam L is high, the shape of a chamfered surface may be uneven in the moving direction. In such a case, oscillation and modulation frequencies are preferably 1 kHz or more, more preferably 5 kHz or more, and even more preferably 10 kHz or more.

Note that a relative moving speed between the laser beam L and the edge surface of the glass blank 10 is 0.7 to 100 [mm/s], for example.

The width W1 and a length W2, which will be described later, of the luminous flux can be set by adjusting the position to which the glass blank 10 is irradiated with the laser beam L, using two cylindrical lenses, for example. Also, the width W1 can be obtained from a beam profiler, and the length W2 can be obtained from the shape of a beam obtained by the beam profiler and a diameter D of a glass plate.

Then, a magnetic-disk glass substrate is produced by grinding and/or polishing the glass blank 10 provided with chamfered surfaces, that is to say, the main surfaces of the glass plate 1, and further cleaning the main surfaces as appropriate, for example. It is also possible to perform processing for polishing an edge surface of the glass plate 1 as needed. Also, chemical strengthening may be performed on the glass plate 1 as appropriate before and after the main surfaces are ground or polished, or between grinding and polishing of the main surfaces.

Although the edge surface 14 is irradiated with the laser beam L shown in FIG. 2 in order to form a chamfered surface in this embodiment, the temperature of a portion of the edge surface 14 irradiated with the laser beam L is locally increased, resulting in a difference in thermal expansion between the irradiated portion and an inner region in the radial direction, which results in cracks occurring in the vicinity of the edge surface 14 of the glass plate 1 immediately after the chamfered surface is formed. Also, even if the glass plate 1 is not cracked immediately after the chamfered surface is formed, a delayed crack may be sometimes found by immediately before a post-process is performed after chamfering processing. Thus, in this embodiment, the glass blank 10 is preheated before the edge surface 14 is irradiated with the laser beam L in order to form a chamfered surface. At this time, the temperature Tp at which the glass blank 10 is preheated is set to satisfy $(Tg-Tp) \leq -5.67 \times 10^7 \cdot \alpha + 840$ when the temperature of the glass blank 10 used when preheating the glass blank 10 is Tp [° C.], the glass transition point of the glass blank 10 is Tg [° C.], and the average coefficient of linear thermal expansion of the glass blank 10 is $\alpha$ [1/° C.].

In this case, it is preferable to set the temperature Tp at which the glass blank 10 is preheated to satisfy $(Tg-Tp) \leq -3.67 \times 10^7 \cdot \alpha + 500$ from the viewpoint of preventing a delayed crack from occurring. Also, the temperature Tp is preferably set to satisfy $(Tg-Tp) \leq -3.28 \times 10^7 \cdot \alpha + 428$ from the viewpoint of preventing a fracture from occurring.

Because the occurrence of cracks and delayed cracks is suppressed by setting the temperature Tp in this manner, the glass blank 10 need not be annealed after chamfering processing in order to reduce residual strain as in a conventional method. Here, annealing refers to processing in which the chamfered glass blank 10 is heated to a temperature higher than the strain point of the glass and slowly cooled to reduce residual strain (residual stress) in the glass, for example.

Figure 3:
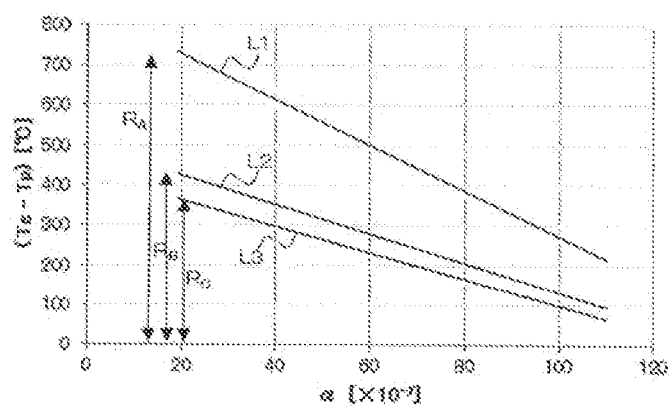
FIG. 3 is a diagram showing one example of a region showing the presence or absence of cracks in a glass plate in a graph with the coordinates of an average coefficient of linear thermal expansion α and a temperature difference (Tg–Tp).

FIG. 3 is a diagram showing one example of a region showing the presence or absence of cracks in the glass blank 10 in a graph with the coordinates of an average coefficient of linear thermal expansion α and a temperature difference (Tg−Tp).

Straight lines L1, L2, and L3 shown in FIG. 3 are straight lines that divide regions where "cracks", "delayed cracks", and "fractures" occur in the glass blank 10.

A "crack" refers to a crack occurring immediately after a chamfered surface is formed, and a "delayed crack" refers to a "crack" that does not occur immediately after a chamfered surface is formed and that occurs with a probability of about 50% to 70% within about 1 hour after chamfering processing. A "fracture" is different from a "crack" or a "delayed crack" that occurs immediately after a chamfered surface is formed, and refers to a cleft or crack that occurs in the glass plate 1 during a post-process (grinding or polishing of main surfaces) in rare cases.

The straight line L1 is a straight line that separates cases where "cracks" occur and cases where no "cracks" occur.

The straight line L2 is a straight line that separates cases where no "delayed cracks" occur and cases where "delayed cracks" occur.

The straight line L3 is a straight line that separates cases where "fractures" occur and cases where no "fractures" occur.

A "crack" occurs in a region located above the straight line L1.

No "cracks" occur in a region $R_A$ located at the same level as or below the straight line L1.

No "cracks" or "delayed cracks" occur in a region $R_B$ located at the same level as or below the straight line L2.

No "cracks", "delayed cracks", or "fractures" occur in a region $R^C$ located at the same level as or below the straight line L3.

It is possible to separate the presence and absence of "cracks", "delayed cracks", and "fractures" based on the average coefficient of linear thermal expansion α and the temperature difference (Tg−Tp).

Thus, in order to avoid the occurrence of "cracks" immediately after a chamfered surface is formed, it is sufficient to set the temperature Tp according to the average coefficient of linear thermal expansion α and Tg of the glass plate 1 such that the temperature difference (Tg−Tp) is located at the same level as the straight line L1 or in the region $R_A$, $R_B$, or $R_C$ that is located below the straight line L1. That is to say, the straight line L1 is represented by $(Tg-Tp) = -5.67 \times 10^7 \cdot \alpha + 840$, and thus the temperature Tp is set to satisfy $(Tg-Tp) \leq -5.67 \times 10^7 \cdot \alpha + 840$.

Furthermore, in order to avoid the occurrence of "delayed cracks", it is sufficient to set the temperature Tp according to the average coefficient of linear thermal expansion α and Tg of the glass plate 1 such that the temperature difference (Tg−Tp) is located at the same level as the straight line L2 or in the region $R_B$ or $R_C$ that is located below the straight line L2. That is to say, the straight line L2 is represented by $(Tg-Tp) = -5.67 \times 10^7 \cdot \alpha + 840$, and thus the temperature Tp is set to satisfy $(Tg-Tp) \leq -3.67 \times 10^7 \cdot \alpha + 500$.

Furthermore, in order to avoid the occurrence of "fractures", it is sufficient to set the temperature Tp according to the average coefficient of linear thermal expansion α and Tg of the glass plate 1 such that the temperature difference (Tg−Tp) is located at the same level as the straight line L3 or in the region $R_C$ that is located below the straight line L3. That is to say, the straight line L3 is represented by $(Tg-Tp) = -3.28 \times 10^7 \cdot \alpha + 428$, and thus the temperature Tp is set to satisfy $(Tg-Tp) \leq -3.28 \times 10^7 \cdot \alpha + 428$.

According to one embodiment, it is preferable to satisfy (Tg−Tp)≥50° C. It is not preferable that the difference between the temperature Tp and the glass transition point Tg in preheating is less than 50° C. because there is a concern that the glass blank 10 may deform, and flatness may deteriorate (increase). Deterioration of flatness is not preferable because the machining allowance in the plate thickness direction in the subsequent process may increase. Here, flatness refers to a PV value (a difference value between the highest value and the lowest value in the height direction) of the flatness on the entire main surface, and the flatness can be measured using a flatness tester, or the like, for example. Also, deterioration of flatness refers to flatness changing by 30 μm or more, for example. Note that it is more preferable that (Tg−Tp)≥100° C. because deterioration of flatness can be suppressed to 15 μm or less.

Although there is no particular limitation on the average coefficient of linear thermal expansion α of the glass plate 1, if the glass plate 1 is to ultimately be used as a magnetic-disk substrate in a hard disk drive device, the average coefficient of linear thermal expansion α is $100 \times 10^{-7}$ [1/° C.] or less, for example. According to one embodiment, it is preferable that the average coefficient of linear thermal expansion α is in a range of $20 \times 10^{-7}$ [1/° C.] to $60 \times 10^{-7}$ [1/° C.]. If the average coefficient of linear thermal expansion α exceeds $60 \times 10^{-7}$ [1/° C.], the applicable upper limit of (Tg−Tp) is relatively low, and the temperature Tp is close to the glass transition point Tg, and thus the temperature Tp needs to be strictly controlled. If the temperature Tp and the glass transition point Tg are excessively close to each other, there is a concern that flatness may deteriorate due to the glass plate 1 being softened. Also, if the average coefficient of linear thermal expansion α is less than $20 \times 10^{-7}$ [1/° C.] and a glass plate is used in a magnetic disk of a hard disk drive device, there is a concern that the difference in the coefficient of linear thermal expansion between the glass plate and the spindle material of the hard disk drive device may be excessively large, and thus the glass plate may be cracked when the spindle expands due to heat. Note that, from the above viewpoint, the upper limit of the average coefficient of linear thermal expansion α is more preferably $45 \times 10^{-7}$ [1/° C.]. Also, from the above viewpoint, the lower limit of the average coefficient of linear thermal expansion α is more preferably $30 \times 10^{-7}$ [1/° C.].

In this manner, it is possible to produce an annular glass plate 1 that has an inner circumferential edge surface and an outer circumferential edge surface provided with chamfered surfaces and that has no "cracks" occurring immediately after laser photoirradiation, through preheating and irradiation with the laser beam L.

Here, it is preferable that the maximum residual stress in a portion of a main surface located in the vicinity of the inner circumferential edge surface of the glass plate 1 (annular region on the main surface within 3 mm in the radial direction with the radius of the inner circumferential edge surface as the reference (zero)), that is to say, the maximum residual stress at an end portion of the main surface located in the vicinity of the inner circumferential edge surface, is larger than the maximum residual stress in a portion of the main surface located in the vicinity of an outer circumferential edge surface (annular region on the main surface within 3 mm in the radial direction with the radius of the outer circumferential edge surface as the reference (zero)), that is to say, the maximum residual stress at an end portion of the main surface located in the vicinity of the outer circumferential edge surface. As a result of setting the entire main surface of the glass blank to a substantially uniform temperature in preheating, it is possible to form peaks of the residual stress at the end portion of the main surface located in the vicinity of the inner circumferential edge surface and at the end portion of the main surface located in the vicinity of the outer circumferential edge surface when the residual stress is viewed in the radial direction of the glass plate 1.

The residual stress occurring at an end portion or an edge surface of the main surface through irradiation with a laser beam is generally compressive stress. On the other hand, if a magnetic-disk glass substrate and a magnetic disk are manufactured using the annular glass plate 1, and the magnetic disk is built in an HDD device, the end portion and edge surface of the main surface located on the inner circumferential edge surface side may come into strong contact with a spindle, a spacer, a damper, or the like of the HDD device, and may be scratched. The residual stress inhibits the magnetic disk from being scratched through the above-described contact in such a circumstance. That is to say, the above-described effects can be obtained by making the retardation value at the end portion of the main surface located on the inner circumferential edge surface side larger than the retardation value at the end portion of the main surface located on the outer circumferential edge surface side. Note that residual stress at the end portion of the main surface located in the vicinity of the inner circumferential edge surface is preferably set to 50 [nm] or less, more preferably 20 [nm] or less, in terms of a retardation value. Also, residual stress at the end portion of the main surface located in the vicinity of the outer circumferential edge surface is preferably set to 30 [nm] or less in terms of retardation value.

Also, the residual stress in a region of the main surface of the glass plate 1 other than the end portion of the main surface located on the inner circumferential edge surface side and the end portion of the main surface located on the outer circumferential edge surface side (also referred to as "middle peripheral region" hereinafter) is preferably smaller than the maximum residual stress at the end portion of the main surface located on the inner circumferential edge surface side and/or the end portion of the main surface located on the outer circumferential edge surface side. The residual stress in this middle peripheral region is preferably 20 [nm] or less and more preferably 10 [nm] or less in terms of a retardation value.

Further, any portion of the main surface of the glass plate 1 preferably has a residual stress of 50 [nm] or less, and more preferably has a residual stress of 20 [nm] or less, in terms of a retardation value.

In the present invention, a retardation value is used as a residual stress value. The retardation value can be measured using a two-dimensional birefringence evaluation apparatus such as PA-200 manufactured by Photonic Lattice, Inc., for example. When distribution of retardation values on the main surface of the glass plate 1 is to be examined, it is sufficient that the measurement resolution is about 0.05 to 0.2 mm in the in-plane direction, for example.

In order to obtain the glass plate 1 described above, the temperature Tp at which the inner circumferential edge surface is chamfered need only be lower than the temperature Tp at which the outer circumferential edge surface is chamfered within a range where the conditions of the region $R_C$ shown in FIG. 3 are satisfied, for example. In the case of the same glass plate 1, the glass transition point Tg and the average coefficient of linear thermal expansion $\alpha$ do not change, and thus, if the temperature Tp is lowered, (Tg−Tp) increases, resulting in an increase in residual stress. Note that, if the glass plate 1 described above is to be obtained, it is preferable to perform (1) preheating, (2) outer circumferential edge surface chamfering processing, and (3) inner circumferential edge surface chamfering processing in the stated order. Because the temperature of the glass blank during inner circumferential edge surface chamfering processing can be easily lowered using natural cooling in this order, preheating can be completed in the first instance.

If a magnetic-disk glass substrate is produced from the glass plate 1, the main surfaces of the glass plate 1 are ground and/or polished using the glass plate 1 as an intermediate glass plate after the above-described chamfering processing and before the glass plate 1 becomes a magnetic-disk glass substrate. Out of these processes, grinding processing need not be performed.

If grinding processing and polishing processing are performed, the glass plate 1 is ground and then polished.

In grinding processing, a double-side grinding apparatus provided with a planetary gear mechanism is used to grind main surfaces on both sides of the glass plate 1, for example. Specifically, the main surfaces on both sides of the glass plate 1 are ground while the glass plate 1 is held in a holding hole provided in a holding member (carrier) of the double-side grinding apparatus. The double-side grinding apparatus has a pair of upper and lower surface plates (an upper surface plate and a lower surface plate), and the glass plate 1 is held between the upper surface plate and the lower surface plate. Then, it is possible to grind the two main surfaces of the glass plate 1 by moving the glass plate 1 and the surface plates relative to each other while moving one or both of the upper surface plate and the lower surface plate and supplying coolant. Grinding members obtained by forming fixed abrasive particles in which diamonds are fixed by resin into a sheet shape are mounted on the surface plates, and then grinding processing can be performed, for example. The flatness of the main surface can be reduced by performing grinding processing. The flatness of the ground main surface is 10 μm or less in terms of a PV value of the flatness, for example.

Then, first polishing is performed on the main surfaces of the ground glass plate 1. Specifically, the main surfaces on both sides of the glass plate 1 are polished while the glass plate 1 is held in a holding hole provided in a polishing carrier of the double-side polishing apparatus. The first polishing is performed in order to remove blemishes and strain remaining on the ground main surfaces or roughly adjust (reduce) minute unevenness (micro-waviness and roughness) remaining on the surfaces.

In the first polishing processing, the glass plate 1 is polished using a double-side polishing apparatus having a configuration similar to that of the above-described double-side grinding apparatus that is used in the grinding processing with fixed abrasive particles, while a polishing slurry is provided. In the first polishing processing, a polishing slurry containing loose abrasive particles is used. Cerium oxide abrasive particles, zirconia abrasive particles, or the like are used as loose abrasive particles used in the first polishing, for example. Similar to the double-side grinding apparatus, the glass plate 1 is also held between the upper surface plate and the lower surface plate in the double-side polishing apparatus. Tabular polishing pads (resin polishers, for example) having an annular shape overall are attached to the upper surface of the lower surface plate and the bottom surface of the upper surface plate. The glass plate 1 and the surface plates are moved relative to each other by moving one or both of the upper surface plate and the lower surface plate, and thereby the two main surfaces of the glass plate 1 are polished. The size of polishing abrasive particles is preferably in a range of 0.5 to 3 µm in terms of an average particle diameter (d50).

The glass plate 1 may be chemically strengthened after the first polishing or second polishing. In this case, a melt in which potassium nitrate and sodium nitrate are mixed, for example, can be used as the chemical strengthening liquid, and the glass plate 1 is immersed in the chemical strengthening liquid. Accordingly, it is possible to form a compressive stress layer on the surface of the glass plate 1 through ion exchange.

Then, the second polishing is performed on the glass plate 1. The second polishing processing is performed in order to finishing the main surfaces. The second polishing processing is mirror-polishing. A double-side polishing apparatus having a configuration that is similar to that of the double-side polishing apparatus used in the first polishing is used in the second polishing as well. Specifically, the main surfaces on both sides of the glass plate 1 are polished while the glass plate 1 is held in a holding hole provided in a polishing carrier of the double-side polishing apparatus. The second polishing processing differs from the first polishing processing in that the type and particle size of loose abrasive particles are different, and the hardness of the resin polishers is also different. It is preferable that the hardness of a resin polisher is smaller than that in the first polishing processing. A polishing liquid containing colloidal silica as the loose abrasive particles is supplied between the polishing pads of the double-side polishing apparatus and the main surfaces of the glass plate 1, and the main surfaces of the glass plate 1 are polished, for example. The size of polishing abrasive particles used in the second polishing is preferably in a range of 5 to 50 nm in terms of an average particle diameter (d50). The roughness of the main surface of the glass plate 1 after the second polishing processing is an arithmetic average roughness Ha of 0.2 nm or less when measured through AFM, for example.

Note that whether or not chemical strengthening processing is to be carried out need only be selected as appropriate in consideration of the composition of the glass and how necessary chemical strengthening processing may be therefor. Also, other polishing processing may be further added in addition to the first polishing processing and the second polishing processing, or processing for polishing two main surfaces may be completed through single polishing processing. Also, the order of the above-described processes may be changed as appropriate.

It is possible to obtain a magnetic-disk glass substrate that satisfies the conditions required for a magnetic-disk glass plate by polishing main surfaces of the glass plate 1 in this manner.

Thereafter, a magnetic disk can be produced by forming at least a magnetic film on the glass plate 1 (magnetic-disk glass substrate) produced by polishing the main surfaces.

The main surfaces of the glass plate 1 that has been subjected to chamfering processing are ground or polished in the method for manufacturing the glass plate 1. In this case, no edge surfaces are polished after the edge surfaces are chamfered and before the main surfaces are ground or polished, or even if an edge surface is polished, the machining allowance for polishing an edge surface can be set to 5 µm or less. Thus, it is possible to reduce manufacturing costs by reducing the amount of an edge surface to be polished. This is because it is possible to form a chamfered surface (edge surface) with low surface unevenness by the laser beam L. In other words, a fire-polished surface can be formed at an edge surface (a chamfered surface and a side wall surface) through irradiation with the laser beam L. A fire-polished surface is formed by heating and melting a glass surface, resulting in a smooth surface with few scratches or microcracks. The surface roughness of a chamfered surface (edge surface) formed through irradiation with the laser beam L can be set to 50 nm or less in terms of an arithmetic average roughness Ra (JIS B0601 2001), for example. Note that the above-described arithmetic average roughness Ra is more preferably set to 30 nm or less, and even more preferably set to 20 nm or less. The arithmetic average roughness Ra of an edge surface can be measured using a laser microscope, for example.

According to one embodiment, the glass plate 1 can be composed of glass having a glass transition point Tg of 500° C. or more. The glass transition point Tg is preferably 650° C. or more, and more preferably 750° C. or more. The higher the glass transition point Tg is, the further thermal shrinkage occurring when the glass plate 1 is heated and deformation (substrate warpage etc.) caused by thermal shrinkage can be suppressed. Thus, the glass transition point Tg is preferably set to 650° C. or more, and more preferably set to 750° C. or more in consideration of heat treatment performed to form a magnetic film for a magnetic disk or the like on a magnetic-disk glass substrate.

It is possible to use aluminosilicate glass, soda lime glass, borosilicate glass, or the like as the material of the glass plate 1 or the glass blank 10 in this embodiment. Also, amorphous glass is further preferable because a magnetic-disk glass substrate whose main surfaces have high flatness and that has high strength can be produced.

Although there is no limitation on the composition of the glass plate 1 or the glass blank 10 of this embodiment, the glass plate 1 or the glass blank 10 of this embodiment is preferably amorphous aluminosilicate glass having a composition containing, in terms of oxide amount in mol %, $SiO_2$ in an amount of 50 to 75 mol %, $Al_2O_3$ in an amount of 1 mol % to 15 mol %, $B_2O_3$ in an amount of 0 to 15 mol %, and at least one selected from $Li_2O$, $Na_2O$, and $K_2O$ in a total amount of 0 to 35 mol %, at least one selected from MgO, CaO, SrO, BaO, and ZnO in a total amount of 0 to 20 mol %, and at least one selected from $ZrO_2$, $TiO_2$, $La_2O_3$, $Y_2O_3$, $Ta_2O_5$, $Nb_2O_5$, and $HfO_2$ in a total amount of 0 to 10 mol %.

EXPERIMENTAL EXAMPLES

In order to confirm the effects of the method for manufacturing the glass plate 1 according to this embodiment, various glass blanks 10 having different average coefficients of linear thermal expansion α were prepared, the glass plates 1 were produced at various temperatures Tp at which the glass blanks 10 were preheated, and "cracks" and "delayed cracks" in the glass plates 1 were visually observed. Also, if a glass plate 1 did not have "cracks" or "delayed cracks", the glass plate 1 was ground and polished, and then "fractures" were visually observed.

The glass plate 1 had an outer diameter of 95 mm, an inner hole had an inner diameter of 25 mm, and the glass plate 1 had a thickness Th of 0.7 mm.

The entire main surface of the glass blank 10 was heated using an infrared heater in preheating. The inner circumferential edge surface and the outer circumferential edge surface were heated through preheating simultaneously. The temperature Tp of the glass blank 10 was measured using a non-contact thermometer (thermography). When the temperature of a main surface of the glass blank 10 when heated was measured, the temperature of a middle peripheral portion of the main surface was Tp, which was a substantially uniform temperature in the entire main surfaces including in the vicinities of the inner circumferential edge surface and the outer circumferential edge surface.

The irradiation conditions of the laser beam L were as follows: the width W1 was 1 mm, the length W2 was 10 mm, and the average power density Pd was 5.1 [W/mm$^2$]. The moving speed of the laser beam L along the edge surface 14 was set to 20 [mm/s]. The outer circumferential edge surface of the glass blank 10 was chamfered first, and then the inner circumferential edge surface thereof was chamfered. Preheating was performed at the temperature Tp before outer circumferential edge surface chamfering processing, and the outer circumferential edge surface chamfering processing and the inner circumferential edge surface chamfering processing were performed in the stated order while the temperature was being maintained. Note that, after chamfering processing, annealing processing for reducing residual stress on main surfaces was not performed.

Crack occurrence levels under conditions are shown in Table 1 below. "C" in the "crack occurrence level" column means that a "crack" occurred immediately after laser photoirradiation, and "B" means that, although no "cracks" occurred immediately after laser photoirradiation, a "delayed crack" occurred. "A" means that, although no "cracks" or "delayed cracks" occurred immediately after laser photoirradiation, a "fracture" occurred. "AA" means that no "cracks", "delayed cracks", or "fractures" occurred immediately after laser photoirradiation.

TABLE 1

| Conditions | α [×10$^{-7}$/° C.] | (Tg − Tp) [° C.] | Crack occurrence level |
|---|---|---|---|
| 1 | 30 | 690 | C |
| 2 | 35 | 670 | C |
| 3 | 40 | 640 | C |
| 4 | 60 | 520 | C |
| 5 | 95 | 330 | C |
| 6 | 30 | 660 | B |
| 7 | 35 | 640 | B |
| 8 | 40 | 610 | B |
| 9 | 60 | 490 | B |
| 10 | 95 | 300 | B |
| 11 | 30 | 520 | B |
| 12 | 35 | 500 | B |
| 13 | 40 | 470 | B |
| 14 | 60 | 380 | B |
| 15 | 95 | 220 | B |
| 16 | 30 | 380 | A |
| 17 | 35 | 370 | A |
| 18 | 40 | 350 | A |
| 19 | 60 | 270 | A |
| 20 | 95 | 150 | A |
| 21 | 30 | 360 | A |
| 22 | 35 | 340 | A |

TABLE 1-continued

| Conditions | α [×10$^{-7}$/° C.] | (Tg − Tp) [° C.] | Crack occurrence level |
|---|---|---|---|
| 23 | 40 | 320 | A |
| 24 | 60 | 250 | A |
| 25 | 95 | 130 | A |
| 26 | 30 | 320 | AA |
| 27 | 35 | 310 | AA |
| 28 | 40 | 290 | AA |
| 29 | 60 | 230 | AA |
| 30 | 95 | 110 | AA |

According to the results of Table 1, it was found that, by performing preheating to satisfy (Tg−Tp)≤−5.67×10$^7$·α+ 840 (conditions 6 to 15), "cracks" did not occur immediately after laser photoirradiation.

Also, it was found that, by performing preheating to satisfy (Tg−Tp)≤−3.67×10$^7$·α+500 (conditions 16 to 25), no "delayed cracks" occurred.

Also, it was found that, by performing preheating to satisfy (Tg−Tp)≤−3.28×10$^7$·α+428 (conditions 26 to 30), no "fractures" occurred.

Then, annular glass plates 1 were produced under the conditions 26 to 28 such that the temperature was adjusted such that the temperature Tp when chamfering the inner circumferential edge surfaces is 20° C. lower than the temperature Tp when chamfering the outer circumferential edge surfaces, and the main surfaces thereof were polished to have an arithmetic average roughness Ra of 0.2 nm or less, and thus magnetic-disk glass substrates were obtained (conditions 31 to 33). Retardation was measured for the annular glass plates 1 obtained under the conditions 31 to 33 before the main surfaces thereof were polished and for the magnetic-disk glass substrates after the main surfaces thereof were polished. The retardation values and distributions before and after the main surfaces were polished were almost the same under any conditions. Specifically, under any conditions, the maximum residual stress of a main surface was 50 nm or less, peaks of the retardation values were present in the vicinity of the outer circumferential edge surface and the vicinity of the inner circumferential edge surface in the radial direction, and the maximum residual stress at the end portion of the main surface located in the vicinity of the inner circumferential edge surface was larger than the maximum residual stress at the end portion of the main surface located in the vicinity of the outer circumferential edge surface. Also, the maximum residual stress at the end portion of the main surface located in the vicinity of the inner circumferential edge surface was 50 nm or less, the maximum residual stress at the end portion of the main surface located in the vicinity of the outer circumferential edge surface was 30 nm or less, and the residual stress in the middle peripheral region was 20 nm or less. Further, the outer circumferential edge surface and the inner circumferential edge surface had a surface roughness Ra of 50 nm or less.

Also, annular glass plates 1 were produced under the same condition as the condition 30, except that (Tg−Tp) was changed (conditions 34 to 37). Crack occurrence levels under these conditions were all AA. Table 2 shows results obtained by measuring the flatness of the glass blanks and glass plates before and after photoirradiation processing including preheating under these conditions, and calculating the amount of increase in flatness.

TABLE 2

| Conditions | (Tg − Tp) [° C.] | Amount of increase in flatness [μm] |
|---|---|---|
| 30 | 110 | 13 |
| 34 | 100 | 15 |
| 35 | 90 | 18 |
| 36 | 70 | 24 |
| 37 | 50 | 30 |

According to the results of Table 2, it was found that, when (Tg−Tp)≥50° C. is satisfied, the amount of increase in flatness can be suppressed to 30 μm or less. Also, it was found that, when (Tg−Tp)≥100° C. is satisfied, the amount of increase in flatness can be further suppressed to 15 μm or less.

As described above, although a method for manufacturing a glass plate, a method for manufacturing a magnetic-disk glass substrate, a method for manufacturing a magnetic disk, and an annular glass plate according to the present invention have been described in detail, the present invention is not limited to the above-described embodiments and examples etc., and it will be appreciated that various improvements and modifications can be made without departing from the gist of the present invention.

The invention claimed is:

1. A method for manufacturing a glass plate, the method comprising:
 chamfering processing for chamfering an inner circumferential edge surface and an outer circumferential edge surface of a glass blank, the glass blank having an annular shape with a circular hole at a central portion of the glass blank, the glass blank including a pair of main surfaces, the inner circumferential edge surface forming a contour of the circular hole, and the outer circumferential edge surface, the chamfering processing including
 forming a chamfered surface by irradiating, with a laser beam, the inner circumferential edge surface of the glass blank,
 forming a chamfered surface by irradiating, with the laser beam, the outer circumferential edge surface of the glass blank, and
 heating the glass blank before irradiation with the laser beam to the inner circumferential edge surface and the outer circumferential edge surface of the glass blank,
 the chamfering processing being performed such that a retardation value at an inner end portion of one of the main surfaces, which is located on an inner circumferential edge surface side of the one of the main surfaces, is larger than a retardation value at an outer end portion of the one of the main surfaces, which is located on an outer circumferential edge surface side of the one of the main surfaces,
 wherein, when a temperature of the glass blank at which the glass blank is heated is Tp [° C.], a glass transition point of the glass blank is Tg [° C.], and an average coefficient of linear thermal expansion of the glass blank is α [1/° C.], (Tg−Tp)≤−3.28×10$^7$·α+428 is satisfied, and
 the glass transition point of the glass blank is 650° C. or more.

2. The method for manufacturing a glass plate according to claim 1,
 wherein (Tg−Tp)≥50° C. is satisfied.

3. The method for manufacturing a glass plate according to claim 1, wherein the glass blank has an average coefficient of linear thermal expansion α of 20×10$^{-7}$ [1/° C.] to 60×10$^{-7}$ [1/° C.].

4. The method for manufacturing a glass plate according to claim 1,
 wherein annealing processing is not performed on the glass blank obtained after being subjected to the chamfering processing.

5. A method for manufacturing a magnetic-disk glass substrate, the method comprising:
 manufacturing the glass plate with the method according to claim 1; and
 grinding and/or polishing a main surface of the glass plate.

6. A method for manufacturing a magnetic disk, the method comprising:
 manufacturing the magnetic-disk glass substrate according to claim 5; and
 forming a magnetic film is formed on a main surface of the magnetic-disk glass substrate.

7. The method for manufacturing a glass plate according to claim 1,
 wherein the irradiating the inner circumferential edge surface of the glass blank with the laser beam is performed after the irradiating the outer circumferential edge surface of the glass blank with the laser beam.

8. A method for manufacturing a glass plate, the method comprising:
 chamfering processing for chamfering an inner circumferential edge surface and an outer circumferential edge surface of a glass blank, the glass blank having an annular shape with a circular hole at a central portion of the glass blank, the glass blank including a pair of main surfaces, the inner circumferential edge surface forming a contour of the circular hole, and the outer circumferential edge surface, the chamfering processing including
 forming a chamfered surface by irradiating, with a laser beam, the outer circumferential edge surface of the glass blank, and forming a chamfered surface by irradiating, with the laser beam, the inner circumferential edge surface of the glass blank, in an order of the irradiating of the outer circumferential edge surface and the irradiating of the inner circumferential edge surface, and
 heating the glass blank before irradiation with the laser beam to the outer circumferential edge surface of the glass blank,
 the chamfering processing being performed such that a retardation value at an inner end portion of one of the main surfaces, which is located on an inner circumferential edge surface side of the one of the main surfaces, is larger than a retardation value at an outer end portion of the one of the main surfaces, which is located on an outer circumferential edge surface side of the one of the main surfaces,
 wherein, when a temperature of the glass blank at which the glass blank is heated is Tp [° C.], a glass transition point of the glass blank is Tg [° C.], and an average coefficient of linear thermal expansion of the glass blank is α [1/° C.], (Tg−Tp)≤−5.67×10$^7$·α+840 is satisfied, and
 a temperature of the glass blank at which the inner circumferential edge surface is irradiated with the laser beam is lower than a temperature of the glass blank at which the outer circumferential edge surface is irradiated with the laser beam.

9. The method for manufacturing a glass plate according to claim 8, wherein $(Tg-Tp) \leq -3.67 \times 10^7 \cdot \alpha + 500$ is satisfied.

10. The method for manufacturing a glass plate according to claim 8, wherein $(Tg-Tp) \leq -3.28 \times 10^7 \cdot \alpha + 428$ is satisfied.

11. The method for manufacturing a glass plate according to claim 8, wherein $(Tg-Tp) \geq 50^\circ$ C. is satisfied.

12. The method for manufacturing a glass plate according to claim 8, wherein the glass blank has an average coefficient of linear thermal expansion $\alpha$ of $20 \times 10^{-7}$ [1/° C.] to $60 \times 10^{-7}$ [1/° C.].

13. The method for manufacturing a glass plate according to claim 8, wherein annealing processing is not performed on the glass blank obtained after being subjected to the chamfering processing.

14. A method for manufacturing a magnetic-disk glass substrate, the method comprising:

manufacturing a glass plate according to claim 8; and grinding and/or polishing a main surface of the glass plate.

15. A method for manufacturing a magnetic disk, the method comprising:

manufacturing the magnetic-disk glass substrate according to claim 14; and forming a magnetic film on a main surface of the magnetic-disk glass substrate.

16. A method for manufacturing a glass plate, the method comprising:

chamfering processing for chamfering an inner circumferential edge surface and an outer circumferential edge surface of a glass blank, the glass blank having an annular shape with a circular hole at a central portion of the glass blank, the glass blank including a pair of main surfaces, the inner circumferential edge surface forming a contour of the circular hole, and the outer circumferential edge surface, the chamfering processing including forming a chamfered surface by irradiating, with a laser beam, the inner circumferential edge surface of the glass blank, forming a chamfered surface by irradiating, with the laser beam, the outer circumferential edge surface of the glass blank, and heating the glass blank before irradiation with the laser beam to the inner circumferential edge surface and the outer circumferential edge surface of the glass blank, the chamfering processing being performed such that a retardation value at an inner end portion of one of the main surfaces, which is located on an inner circumferential edge surface side of the one of the main surfaces, is larger than a retardation value at an outer end portion of the one of the main surfaces, which is located on an outer circumferential edge surface side of the one of the main surfaces, wherein, when a temperature of the glass blank at which the glass blank is heated is Tp [° C.], a glass transition point of the glass blank is Tg [° C.], and an average coefficient of linear thermal expansion of the glass blank is $\alpha$ [1/° C.], $(Tg-Tp) \leq -5.67 \times 10^7 \cdot \alpha + 840$ is satisfied, and a temperature of the glass blank at which the inner circumferential edge surface is irradiated with the laser beam is lower than a temperature of the glass blank at which the outer circumferential edge surface is irradiated with the laser beam.

* * * * *